(12) United States Patent
Perez Barrera et al.

(10) Patent No.: US 11,238,727 B2
(45) Date of Patent: Feb. 1, 2022

(54) AERIAL VEHICLE-GROUND VEHICLE COORDINATION

(71) Applicant: Ford Global Technologies, LLC, Dearborn, MI (US)

(72) Inventors: Oswaldo Perez Barrera, Estado de Mexico (MX); Alvaro Jimenez Hernandez, Mexico City (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 227 days.

(21) Appl. No.: 16/485,625

(22) PCT Filed: Feb. 15, 2017

(86) PCT No.: PCT/US2017/017875
§ 371 (c)(1),
(2) Date: Aug. 13, 2019

(87) PCT Pub. No.: WO2018/151712
PCT Pub. Date: Aug. 23, 2018

(65) Prior Publication Data
US 2019/0385442 A1  Dec. 19, 2019

(51) Int. Cl.
*G08G 1/005* (2006.01)
*B64C 39/02* (2006.01)
*G08G 5/00* (2006.01)
*G06K 9/00* (2006.01)

(52) U.S. Cl.
CPC ............ *G08G 1/005* (2013.01); *B64C 39/02* (2013.01); *G08G 5/0013* (2013.01); *G08G 5/0069* (2013.01); *B64C 2201/127* (2013.01); *B64C 2201/208* (2013.01); *G06K 9/00288* (2013.01)

(58) Field of Classification Search
CPC .... G08G 1/005; G08G 5/0013; G08G 5/0069; B64C 39/02; B64C 2201/127; B64C 2201/208; G06K 9/00288
See application file for complete search history.

(56) References Cited

U.S. PATENT DOCUMENTS

| 9,170,117 | B1 | 10/2015 | Abuelsaad et al. |
| 9,371,133 | B2 | 6/2016 | Mays |
| 9,463,875 | B2 | 10/2016 | Abuelsaad et al. |
| 9,471,059 | B1 | 10/2016 | Wilkins |
| 2012/0316680 | A1 | 12/2012 | Olivier, III et al. |
| 2015/0134143 | A1 | 5/2015 | Willenborg |
| 2015/0353195 | A1 | 12/2015 | Peeters et al. |
| 2016/0018224 | A1 | 1/2016 | Isler et al. |
| 2016/0054143 | A1 | 2/2016 | Abuelsaad et al. |
| 2016/0340006 | A1 | 11/2016 | Tang |

FOREIGN PATENT DOCUMENTS

KR  10-2016-0112789 A  9/2016

OTHER PUBLICATIONS

International Search Report and Written Opinion dated May 4, 2017 re Appl. No. PCT/US2017/017875.
Campbell-Dollaghan, "Meet the Drone That's Guiding New Students Around MIT This Fall", Sep. 11, 2013, http://gizmodo.com/meet-the-drone-thats-guiding-new-students-around-mit-t-1294335491.

*Primary Examiner* — Michael D Lang
(74) *Attorney, Agent, or Firm* — Brandon Hicks; Bejin Bieneman PLC

(57) ABSTRACT

An aerial vehicle can proceed to a target location upon receiving a message based on a ground vehicle being at an aerial vehicle deploy location. A user can be identified from an image captured at the target location. The aerial vehicle can be navigated to lead the user to a rendezvous with the vehicle.

20 Claims, 5 Drawing Sheets

AERIAL VEHICLE-GROUND VEHICLE COORDINATION

BACKGROUND

Synchronizing locations of vehicles and users to board vehicles can be difficult. A user requiring pickup may not be at a location accessible to the vehicle. Further, a user may have difficulty navigating from the user's location to the vehicle location for pickup.

DETAILED DESCRIPTION

A method for an unmanned aerial vehicle to operate in cooperation with a ground vehicle is disclosed. The method comprises proceeding to a target location upon receiving a message based on a ground vehicle being at an aerial vehicle deploy location; identifying a user from an image captured at the target location; and navigating the aerial vehicle to lead the user to a rendezvous with the vehicle.

The method can further comprise providing, from a ground vehicle computer, the message that the ground vehicle is at the deploy location. The around vehicle computer can be further programmed to navigate the ground vehicle to the target location.

The method can further comprise determining the deploy location according to one or both of a specified time and specified distance to a pickup location.

The method can further comprise identifying the user from an image captured at the target location by comparing the image captured at the target location with a stored image of a specified user.

The method can further comprise sending a message to a user device at the target location.

The method can further comprise adjusting one or both of a speed and direction of the aerial vehicle according to detecting a speed and direction of a user following the aerial vehicle.

The method can further comprise providing, from a geographically remote computer, the message that the ground vehicle is at the deploy location.

The method can further comprise that the message that the ground vehicle is at the deploy location is sent only after the ground vehicle is stopped at a pickup location selected based on the target location.

The method can further comprise proceeding to the target location from a location other than the deploy location.

Further disclosed is a computing device programmed to execute the any of the above method steps. Yet further disclosed is an aerial vehicle comprising the computing device.

Yet further disclosed is a computer program product, comprising a computer readable medium storing instructions executable by a computer processor, to execute any of the above method steps.

Figure 1:
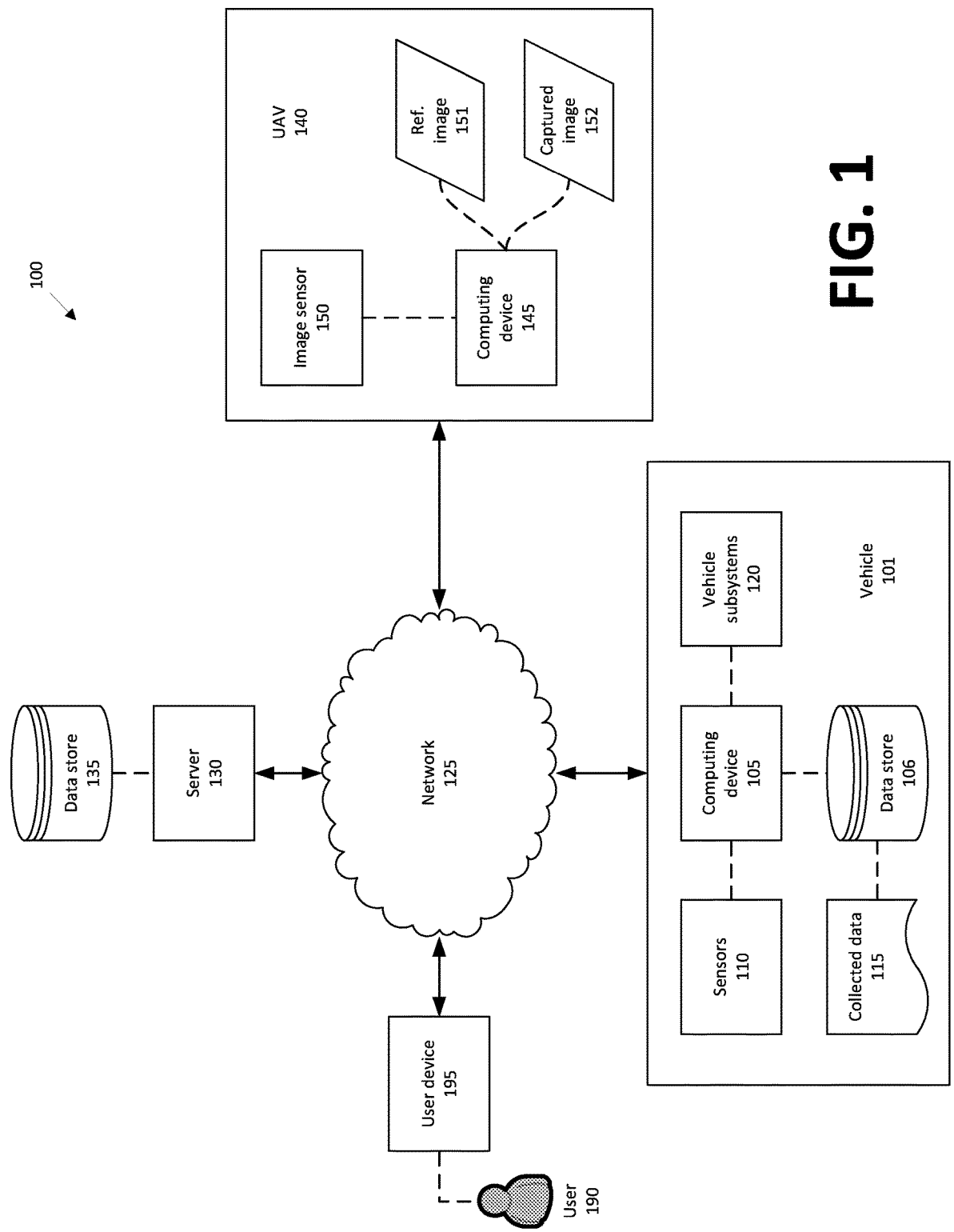
FIG. 1 is a block diagram of an example system for operating a vehicle.
Figure 4:
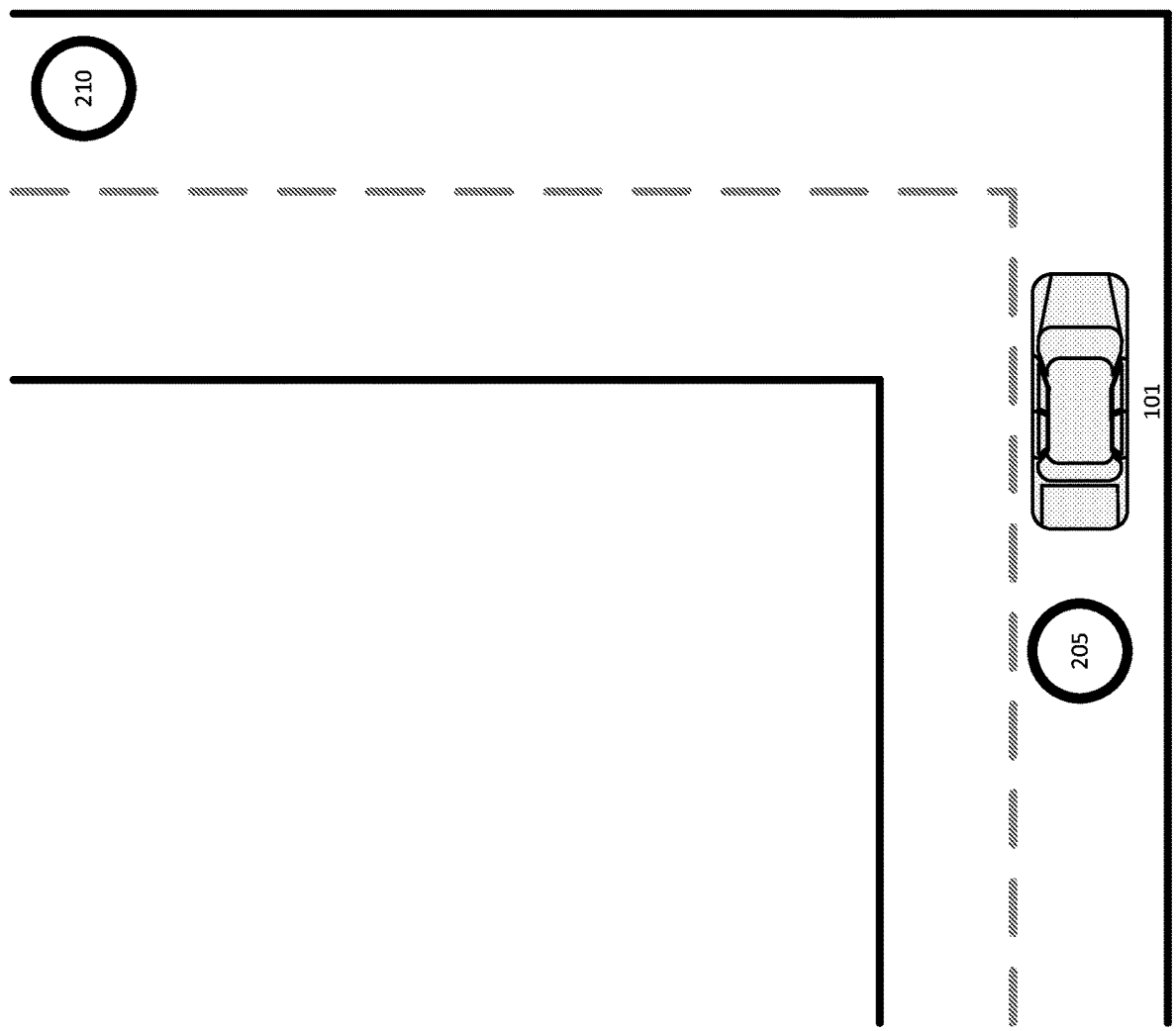
FIG. 4 illustrates an example in which a UAV has been deployed from a vehicle at a deploy location, and is proceeding to the target location.
Figure 5:
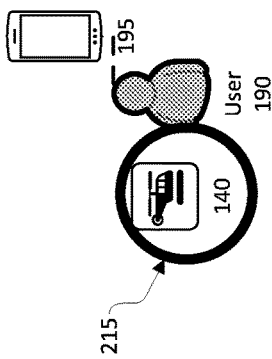
FIG. 5 illustrates an example in which a UAV has reached a target location and a vehicle has reached a pickup location.
Figure 5:
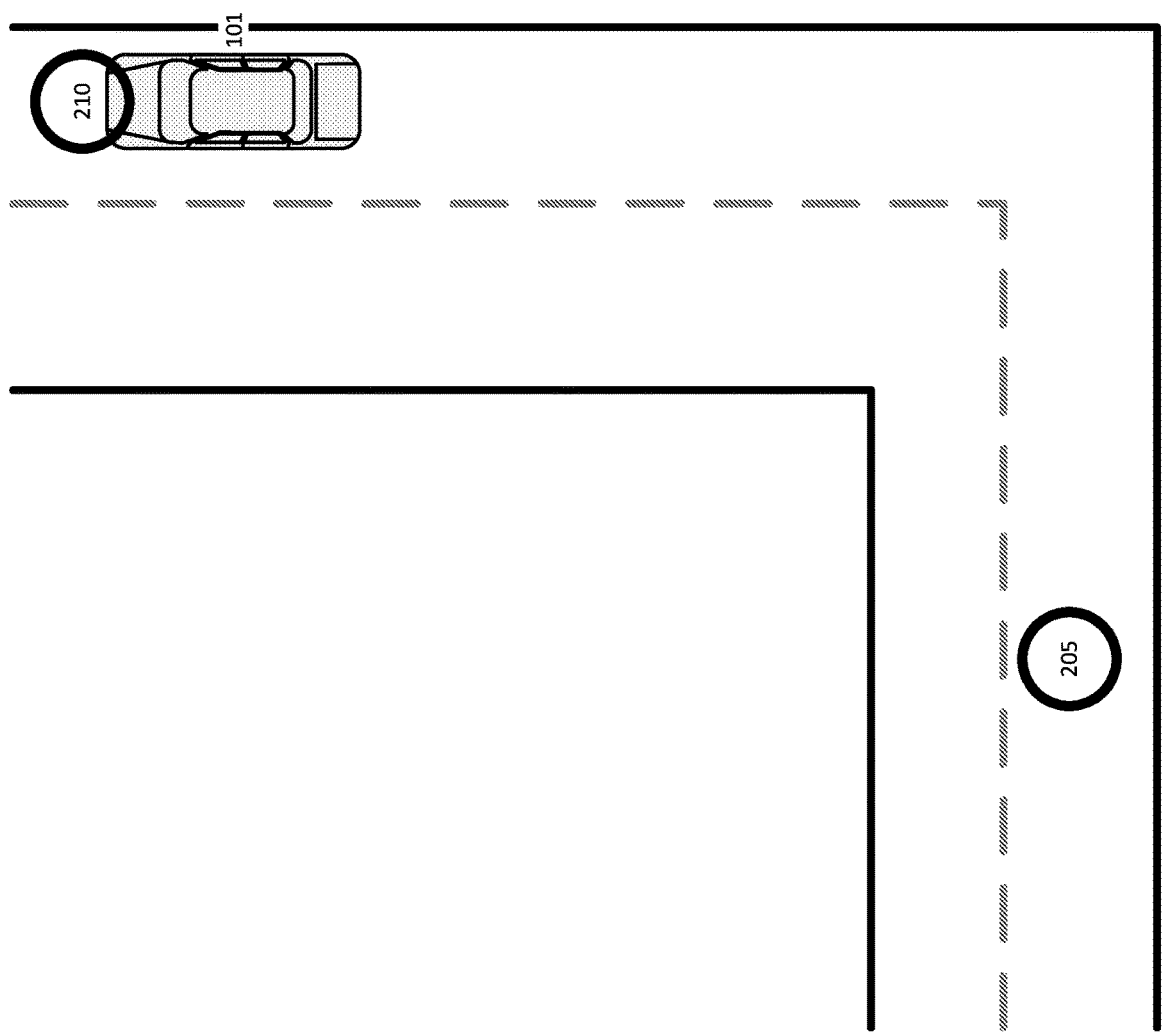

FIG. 1 is a block diagram illustrating an example system 100 for coordinating operations of a ground vehicle 101 and an unmanned aerial vehicle (UAV) 140; FIGS. 4 and 5 illustrate examples of the system 100 in operation. The UAV 140 can be deployed from the vehicle 101 at a deploy location 205 that is a specified amount of travel time and/or distance from a user 190 pickup location 210. The UAV 140 can then lead the user 190 from the target location 215 to the pickup location 210.

For example, the UAV 140 can proceed to a target location 215 typically specified as a user 190 location by a user device 195. A computing device 145 onboard the UAV 140 is programmed to receive, e.g., from a vehicle 101 computing device 105 and/or a geographically remote server 130 (i.e., a computer or computers at a location that is other than on the vehicle 101 or UAV 140, and could be anywhere in the world), a reference image 151 of the user 190, who is to be picked up by the vehicle 101 at the specified pickup location 210. The UAV 140 computing device 145 is further programmed to receive one or more captured images 152 from a UAV 140 image sensor. Upon comparing the reference image 151 to the captured image(s) 152, the UAV 140 computing device 145 can identify and locate the user 190 at or near the target location 215. The computing device 145 is further programmed, upon identifying and locating the user 190, to navigate the UAV 140 to lead the user from the target location 215 to the rendezvous or pickup location 210 at which the user 190 can board the vehicle 101 for transport. Further, the UAV computer 145 can, to assist in leading the user 190 to the target location 215, communicate with a user 190 device 195.

The vehicle 101 computing device 105 is generally programmed for communications on a vehicle 101 network or communications bus, as is known. Via the network, bus, and/or other wired or wireless mechanisms (e.g., a wired or wireless local area network in the vehicle 101), the computing device 105 may transmit messages to various devices in a vehicle 101 and/or receive messages from the various devices, e.g., controllers, actuators, sensors, etc., including sensors 110. Alternatively or additionally, in cases where the computing device 105 actually comprises multiple devices, the vehicle network or bus may be used for communications between devices represented as the computing device 105 in this disclosure. In addition, the computing device 105 may be programmed for communicating with the network 125, which, as described below, may include various wired and/or wireless networking technologies, e.g., cellular, BLUETOOTH®, wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, system and/or component status, directional heading, etc. Further, other sensors 110 could include cameras, motion detectors, etc., i.e., sensors 110 to provide data 115 for evaluating a location of a target, projecting a path of a parking maneuver, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computing device 105, and/or at the server 130. In general, collected data 115 may include any data that may be gathered by the sensors 110 and/or computed from such data.

The vehicle 101 includes a plurality of subsystems 120. The subsystems 120 control vehicle 101 components; the subsystems 120 can include, e.g., a steering subsystem, a propulsion subsystem (including, e.g., an internal combustion engine and or electric motor), a brake subsystem, a park assist subsystem, an adaptive cruise control subsystem, etc. The computing device 105 may actuate the subsystems 120 to control the vehicle 101 components, e.g., to stop the vehicle 101, steer, etc.

The computing device 105 may be programmed to operate some or all of the subsystems 120 with limited or no input from a human operator, i.e., the computing device 105 may be programmed to operate the subsystems 120 as a virtual operator. When the computing device 105 operates the subsystems 120 as a virtual operator, the computing device 105 can ignore input from the human operator with respect to subsystems 120 selected for control by the virtual operator, which provides instructions, e.g., via a vehicle 101 communications bus and/or to electronic control units (ECUs) as are known, to actuate vehicle 101 components, e.g., to apply brakes, change a steering wheel angle, etc. For example, if the human operator attempts to turn a steering wheel during virtual operator steering operation, the computing device 105 may ignore the movement of the steering wheel and steer the vehicle 101 according to its programming.

For purposes of this disclosure, an autonomous mode is defined as one in which each of vehicle 101 propulsion (e.g., via a powertrain including an electric motor and/or an internal combustion engine), braking, and steering are controlled by the computing device 105; in a semi-autonomous mode the computing device 105 controls one or two of vehicle 101 propulsion, braking, and steering.

The system 100 may further include a network 125 connected to a server 130 and a data store 135. The server 130 is geographically remote from the vehicle 101 and the UAV 140. For purposes of this disclosure, "geographically remote" typically means a distance of a mile and usually much more, but at a minimum means that the server 130 is not in a same building or vehicle with the vehicle computer 105 and UAV computer 145. Further, "geographically remote" means that communications with the server 130 can happen only via a wide area network such as the network 125.

Accordingly, the computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks using BLUETOOTH, IEEE 802.11, etc.), local area networks (LAN) and/or wide area networks (WAN), including the Internet, providing data communication services.

The system 100 further includes an unmanned aerial vehicle (UAV) 140. The UAV 140 may be a quadcopter, i.e., a helicopter having four propellers, but could alternatively be, e.g., a helicopter having three to eight propellers, a fixed-wing drone, etc.

The UAV 140 includes a computing device 145 and at least one image sensor 150, e.g., a video and/or still camera that captures digital images 152. The UAV 140 is operable to navigate to the vehicle 101 in a known manner, typically after receiving a command from the server 130. The UAV computing device 145 is programmed to collect images 152 with the image sensor 150. The UAV computing device 145 is further programmed to compare one or more captured images 152 with a stored reference image 151. The reference image 151 could be provided from the remote server 130 or from the vehicle 101 computing device 105. The reference image 151 typically depicts at least a face of a user 190. Using, e.g., known image analysis techniques, the computing device 145 can be programmed to compare the reference image 151 with a captured image 152 to determine if the captured image 152 is of a specified user 190.

The user 190 typically carries a user device 195 to communicate with the UAV 140 computer 145 and/or vehicle 101 computer 105. The user device 195 may be any suitable portable computing device capable of carrying out such communications. For example, the device 145 may be a portable computer, tablet computer, mobile phone, e.g., a smart phone, etc., that includes capabilities for wireless communications using IEEE 802.11, BLUETOOTH, and/or cellular communications protocols, etc.

Figure 2:
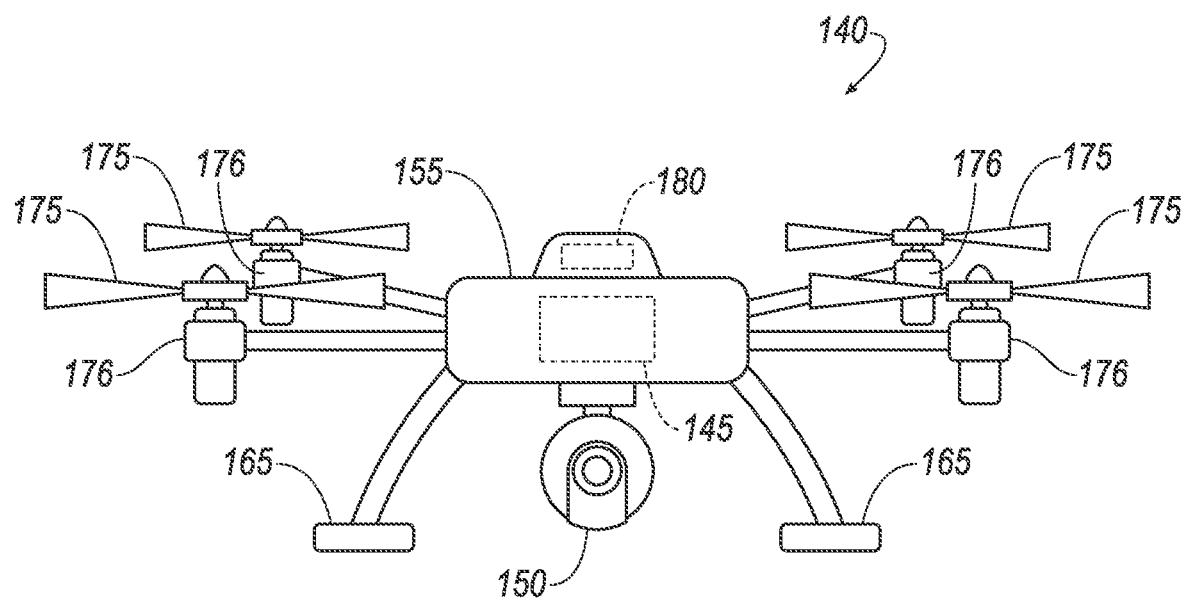
FIG. 2 illustrates an example unmanned aerial vehicle (UAV).

FIG. 2 illustrates an example UAV 140. The UAV 140 includes a chassis 155 that supports the computing device 145 and the image sensor 150, as well as possibly other components, such as a battery 180 and others discussed below. The image sensor 150 may be mounted in a manner to rotate, swivel, and/or move vertically, to allow the image sensor 150 to obtain captured images 152 of different fields of view without requiring to turn or otherwise adjust its attitude.

Figure 3:
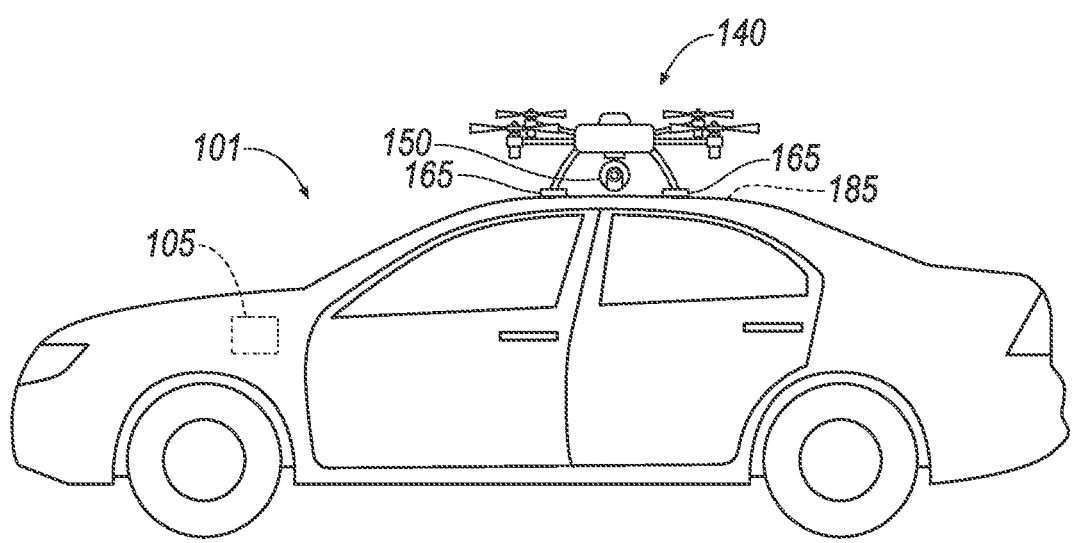
FIG. 3 illustrates an example vehicle with a UAV docked thereon.

The UAV 140 may include at least one foot 165. The foot 165 allows the UAV 140 to attach to the vehicle 101, e.g., on a roof 185 of the vehicle 101 as shown in FIG. 3. The foot 165 is connected to the chassis 155. The example UAV 140 of FIG. 3 has two feet 165. The feet 165 may be constructed of a ferromagnetic material and may include an electromagnet, i.e., the feet 165 in this example are magnetic feet 165. The battery 180 may supply an electric current to the electromagnet to generate an electromagnetic field, magnetizing the feet 165 and attracting the feet 165 to a nearby ferromagnetic surface, e.g., an exterior of a roof 185 of a vehicle 101. In another example, the feet 165 may include a permanent magnet that does not require power from the battery 180. Although magnets are disclosed herein as an example attachment means, it is possible that other attachment means could be used.

The UAV 140 includes a propulsion means such as a motor 176 connected to a propeller 175. The motor 176 can drive the propeller 175, generating lift and allowing the UAV 140 to fly and to hover. The motor 176 may be an electric motor 176 powered by the battery 180. The motor 176 may be attached to the chassis 155. The example UAV 140 of FIG. 2 includes four motors 176 driving four propellers 175. The UAV computing device 145 may selectively actuate the propellers 175 to steer the UAV 140, as is known.

FIG. 3 illustrates an example vehicle 101 with a UAV 140 docked thereon. The UAV 140 in the example of FIG. 3 is attached to an exterior of a roof 185 of the vehicle 101 via the feet 165, but the UAV 140 could be docked elsewhere, e.g., in a trunk or other compartment, on a trunk lid, etc.

The vehicle 101 computer 105 and the UAV 140 computer 145, and/or the user device 195 can communicate with one another via various mechanisms. For example, the computer 145 may be provided with a transceiver to communicate via a cellular network or the like (e.g., the network 125 can be or can include a cellular network), e.g., to send messages using Short Message Service (SMS) or some similar protocol. Further, the computer 105 and UAV 140 computer 145 can communicate via a vehicle 101 network, including possibly a wireless vehicle 101 network, via a short-range protocol such as BLUETOOTH, etc., when the UAV 140 is docked to and/or near, i.e., hovering over, the vehicle 101. Moreover, the computers 105, 145 can communicate via the network 125.

Figures 6, 7:
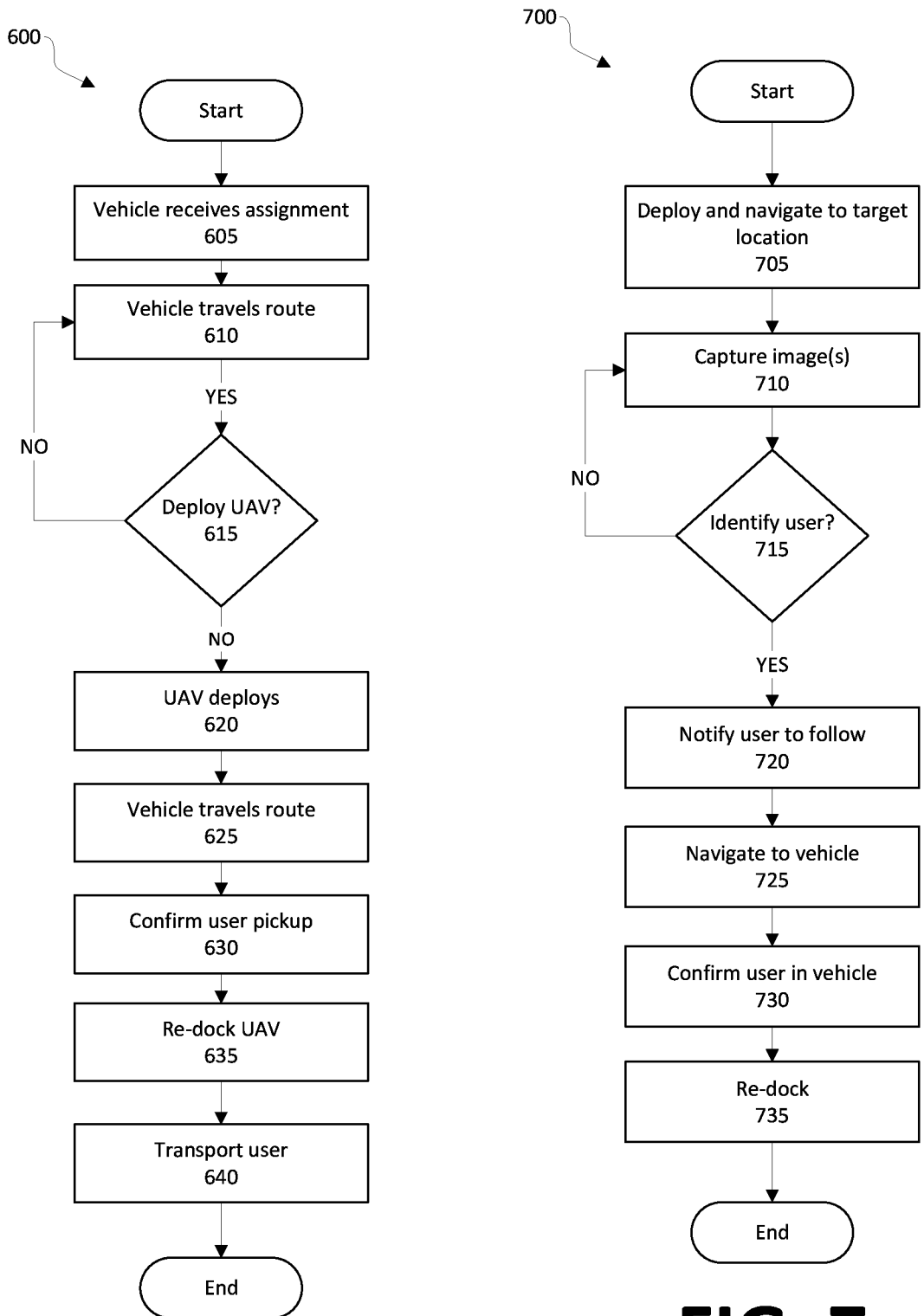
FIG. 6 illustrates an example process for a vehicle to work in cooperation with a UAV.
FIG. 7 illustrates an example process for a UAV to work in cooperation with a vehicle and a user device.

FIG. 6 illustrates an example process 600 for a vehicle 101 to work in cooperation with a UAV 140 to pick up a user 190. The process 600 may be executed by a processor of the vehicle 101 computer 105 according to program instructions stored in a memory of the computer 105. The process 600 can begin in a block 605, in which the vehicle 101 receives an assignment to pick up a user 190 at a specified location, i.e., a target location 215. In addition to the target location 215, the pickup assignment typically includes at least an identifier for the user 190 to be picked up, and possibly also a reference image 151, as well as a requested pickup time, e.g., as soon as possible, 1:30 PM, etc. The assignment can also include the pickup location 210; alternatively, the vehicle 101 computer 105 can determine the pickup location 210 by identifying a closest location to the target location 215 at which the vehicle 101 can stop and wait for a user to board, e.g., by map data that indicates a legal waiting area, traffic data indicating where a roadway is free of traffic that would prevent a stop, etc.

The assignment to pick up a user 190 may be provided in a variety of ways. For example, the vehicle 101 could be a fully autonomous vehicle that could receive dispatch instructions from the server 130. That is, the server 130 could transmit an instruction and/or a route for the vehicle 101 to proceed to a specified location. The server 130 could further provide an identifier for the user 190 to be picked up, as well as a reference image 151 depicting at least a face of the user 190. Additionally or alternatively, an identifier could indicate a user 190 whose reference image 151 is stored in the vehicle 101 computer 105 memory. The server 130 could be prompted to transmit the assignment to the vehicle 101 according to user input, e.g., a user 190 with a user device 195 such as a smart phone or the like, could input a request to the server 130, either when a pickup is needed, or to schedule one or more pickups at a future time.

Alternatively or additionally, an assignment to pick up a user 190 could be provided via user input specifying the target location 215 and possibly also specifying a pickup location 210. For example, the vehicle 101 could be provided with a human machine interface (HMI) to the computer 105. A vehicle 101 occupant could input a target location 215, a pickup time, and an identifier for a user 190 to be picked up at the target location 215 using a vehicle 101 HMI, a smart phone or the like, etc. The vehicle 101 computer 105 could then retrieve a reference image 151 for the identified user 190 from its memory and/or the vehicle 101 occupant could upload the reference image 151.

Following the block 605, in a block 610, the vehicle 101 begins to travel a route to the pickup location 210. The route may be specified in the pickup assignment to the vehicle 101, or could be determined by a vehicle 101 navigational system. Further, the vehicle 101 could be operated non-autonomously, semi-autonomously, or fully autonomously to travel the route.

Next, in a block 615, the computer 105 determines whether to deploy the UAV 140, i.e., whether the vehicle 101 is at a deploy location 205 near, e.g., within a specified amount of travel time and/or specified distance of, the pickup location 210 so that the UAV 140 should be deployed to the target location 215. That is, when the vehicle 101 is close to picking up the user 190, the UAV 140 should be deployed to lead the user 190 to the vehicle 101 for pickup. FIG. 4 illustrates an example in which the UAV 140 has been deployed from the vehicle 101 at a deploy location 205, and is proceeding to the target location 215.

A deploy location 205 can be identified in a variety of ways, e.g., according to one or both of a closeness of the vehicle 101 in time or distance to the pickup location 210. For example, a navigational application in the vehicle 101 may be able to protect a vehicle's time of arrival at the pickup location 210 based on traffic, environmental conditions, distance, etc. The navigational application may further account for a travel time of the UAV 140 from the deploy location 205 or from some other location from which the UAV 140 will be deployed. The navigational application may also be able to estimate a distance, e.g., according to travel on a shortest route, of the for a user 190 to reach the pickup location 210 from the target location 215

Alternatively or additionally, a user 190 device 195 could communicate to the vehicle computer, e.g., via the network 125, an estimated time to the pickup location 210 from the target location 215, possibly accounting for a mode of user travel, e.g., foot, scooter, bicycle, etc. The vehicle computer 105 could then take into account both an estimated time of arrival of the vehicle 101 at the pickup location 210 as well as an estimated time of arrival of the user 190 at the pickup location 210. When these estimated times of arrival are substantially similar, e.g., within 60 seconds, 90 seconds, three minutes, etc., the computer 105 could determine to deploy the UAV 140 to find the user 190.

Further, it is possible that the deploy location 205 and the pickup location 210 will be a same location. That is, in certain circumstances, e.g., heavy traffic, the pickup location 210 and the target location 215 being within predetermined or specified time and/or distance of one another (e.g., less than a 60 second walk, with 100 meters, etc.), the vehicle 101 computer 105 waits until the vehicle 101 is stopped at the pickup location 210 to instruct UAV 140 to deploy.

If the computer 105 determines not to deploy the UAV 140, then the process 600 may return to the block 610. Alternatively, although not shown in FIG. 6, the process 600 could end after the block 615, e.g., because a vehicle 101 was unable to reach a pickup location 210 within a specified time, or at all due to a road blockage, etc. Further, the process 600 could end after the block 615, or at some other point, based on input, e.g., from a user 190 via the device 195 or from the server 130, stating that pickup was no longer needed, that the pickup was canceled, etc. However, if the computer 105 determines in the block 615 that the UAV 140 is to be deployed, then a block 620 is executed next.

In the block 620, the UAV 140 is deployed to the target location 215. In some cases, as discussed above, the UAV 140 is carried on or in the vehicle 101. Accordingly, the computer 105 causes the UAV 140 to be released from the vehicle 101, and sends a message to the UAV 140 computer 145 to deploy, and including the needed assignment information, e.g., a user 190 target location 215, identity, and reference image 151, assuming the image 151 is not already stored in the UAV 140 computer 145 memory. Further, it is possible that the UAV 140 is not carried on the vehicle 101 and/or could be deployed from another location, e.g., a central hanger for UAVs 140. In any case, upon receiving the instruction to deploy and the assignment, information, the UAV 140 begins aerial navigation to the target location 215, i.e., a location at which it is intended that the user 190 will be found. The process 700, discussed below, further describes activities of the UAV 140.

Following the block 620, in a block 625, the vehicle 101 continues to travel the planned route to the pickup location 215 (see FIG. 4).

Next, in a block 630, the vehicle 101, upon arriving at the pickup location 210, waits at the pickup location 210 for the user to board the vehicle 101. FIG. 5 illustrates an example in which the UAV 140 has reached a target location 215 and the vehicle 101 has reached a pickup location 210. Typically the user pickup is confirmed by detecting a user 190 device 195, by receiving user 190 input via the device 195 confirming that the user 190 is in the vehicle 101, etc. However, other mechanisms could be used, such as a vehicle 101 interior camera sensor 110, that could recognize a presence of a user 190 in the vehicle 101 and/or identify the user 190 using a reference image 151 according to known image analysis techniques.

Further, although not shown in FIG. 6, if the vehicle 101 computer 105 is unable to confirm the user pickup, the process 600 could be ended, e.g., if the user 190 is not confirmed in the vehicle 101 within a predetermined period of time after arrival at the pickup location 210, the vehicle 101 could depart the pickup location 210, e.g., to a destination provided by the server 130 such as another pickup, a home location, etc. If the UAV 140 was launched from the vehicle 101, the vehicle 101 would typically wait for the UAV 140 before departing from the pickup location 210. It is also possible that the UAV 140 could return to the vehicle 101 and report that the user 190 could not be located, prompting the process 600 to end and the vehicle 101 to depart the pickup location 210.

Following the block 630, in which the user pickup is confirmed, in a block 635, the UAV 140 is re-docked to the vehicle 101. The block 630 may be omitted when the UAV 140 was not deployed from the vehicle 101.

Next, in a block 640, the vehicle 101 transports the user 190 to a specified location. For example, a user destination could be stored in the vehicle computer 105 according to user input, and instruction from the server 130, etc. Moreover, the vehicle 105 could be operated in a non-autonomous or semi-autonomous mode in which the user 190 or another vehicle 101 occupant controls navigation of the vehicle 101 to reach a destination.

Following the block 640, the process 600 ends.

FIG. 7 illustrates an example process for a UAV to work in cooperation with a vehicle and a user device. The process 700 may be executed according to program instructions stored a in a memory of the UAV 140 computer 145 by a processor of the computer 145. The process 700 can begin in a block 705, in which the UAV 140 receives instruction to deploy and navigate to the target location according to assignment information as described above. Accordingly, the block 705 includes the UAV navigating to the target location 215 (see FIG. 4).

For purposes of this disclosure, the UAV 140 navigating to the target location 215 means navigating to a position that is a predetermined altitude, e.g., five meters, 10 meters, etc., substantially above a target ground location 215, e.g., as specified by geo-coordinates in assignment information. For example, a user device 195 may provide to the server 130 and/or vehicle 101 computer 105 geo-coordinates of the device 195, whereupon the UAV 140 navigates to a position substantially above those geo-accordance.

Next, in a block 710, once the UAV 140 is at the target location 215 (see FIG. 5), the UAV 140 captures one or more images 152 of persons at or near the target location 215. For example, the UAV 140 camera 150 can be used to capture the images 152. The UAV 140 computer 145 could be controlled to actuate the camera 150 capture images 152 in a predetermined radius around the target location 215, for example. The computer 145 could then compare captured images 152 with the stored reference image 151, e.g., using image analysis techniques such as are known, to determine if the user identified in the assignment information is found at the target location 215.

Next, in a block 715, if the user 190 identified in the assignment information is found at the target location 215, then a block 720 is executed next. Otherwise, the process 700 returns to the block 710 to capture further images 152 to attempt to find the user. Further, although not shown in FIG. 7, if the user cannot be found, e.g., after a predetermined period of time, and/or the UAV 140 receives instructions to return to the vehicle or some other location, the process 700 could and either after or during the block 715 or at some other point.

In the block 720, the UAV 140 computer 145 sends a message to the device 195 associated with the identified user 190 that the user 190 should follow the UAV 140. Such message may be sent via the network 125, e.g., as an SMS message or the like, for example. The UAV 140 message to the user 190 could include further information, such as "your ride is a three minute walk away."

Next, in a block 725, the UAV 140 navigates to the vehicle 101 pickup location 210. In so doing, the UAV 140 is typically programmed to proceed at a pace suitable for the user to follow, e.g., 2.5 miles per hour, three miles per hour, etc. Further, the UAV 140 computer 145 could be programmed to receive input, e.g., via the user device 195, to adjust a speed, altitude, direction (i.e., heading), etc., to make the UAV 140 easier for the user to follow. For example, the user device 195 could include an app or the like to communicate with the UAV 140 computer 145 via a short range communication protocol such as BLUETOOTH. Yet further additionally or alternatively, the UAV 140 computer 145 could be programmed, e.g., by analyzing captured images 152 or the like, to determine whether a user is more than a predetermined distance behind, e.g., more than 7 meters, 10 meters, etc., the UAV 140, and to adjust a speed, e.g., slow down by 0.1 or 0.2 miles per hour, to allow the user 190 to keep pace with the UAV 140. The UAV 140 computer 145 could similarly be programmed to adjust a speed of the UAV 140 upward.

Next, once the UAV 140 has arrived at the pickup location 210, the UAV 140 computer 145 confirms that the user 190 is in the vehicle. For example, a confirmation such as described above with respect to the block 630 could be performed, whereupon the vehicle computer 105 could send a message to the UAV 140 computer 145 confirming that the user 190 is in the vehicle 101. Moreover, the process 700, as described above with respect to the process 600, could terminate if it cannot be confirmed that the user 190 is in the vehicle.

Next, in a block 735, the UAV 140 re-does to the vehicle 101, assuming that the UAV 140 was deployed from the vehicle 101. Alternatively, the UAV 140 could return to a specified location, e.g., a hanger from which it was deployed, a home location, etc.

Following the block 735, the process 700 ends.

When this disclosure refers to a "location," is to be understood that the location could be determined in a known manner, e.g., according to geo-coordinates such as are known. For example, global positioning system (GPS) devices can determine latitude and longitude with great precision and could be used to determine locations discussed herein.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

The article "a" modifying a noun should be understood as meaning one or more unless stated otherwise, or context requires otherwise. The phrase "based on" encompasses being partly or entirely based on.

Computing devices 105, 145, etc., generally each include instructions executable by one or more computing devices such as those identified above, and for carrying out blocks or steps of processes described above. The terms "computing device" and "computer" may be used interchangeably in this disclosure. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIG. 6. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising an aerial vehicle computer programmed to:
   proceed to a target location upon receiving a message based on a ground vehicle being at an aerial vehicle deploy location;
   identify a user from an image captured at the target location; and
   navigate the aerial vehicle to lead the user to a rendezvous with the vehicle including by adjusting one or both of a speed and direction of the aerial vehicle according to detecting a speed and direction of the user following the aerial vehicle.

2. The system of claim 1, further comprising a ground vehicle computer, programmed to provide the message that the ground vehicle is at the deploy location.

3. The system of claim 2, wherein the ground vehicle computer is further programmed to navigate the ground vehicle to the target location.

4. The system of claim 1, wherein the deploy location is determined according to one or both of a specified time and specified distance to a pickup location.

5. The system of claim 1, wherein the aerial vehicle computer is further programmed to identify the user from an image captured at the target location by comparing the image captured at the target location with a stored image of a specified user.

6. The system of claim 1, wherein the aerial vehicle computer is further programmed to send a message to a user device at the target location.

7. The system of claim 1, further comprising a geographically remote computer, programmed to provide the message that the ground vehicle is at the deploy location.

8. The system of claim 1, wherein the message that the ground vehicle is at the deploy location is sent only after the ground vehicle is stopped at a pickup location selected based on the target location.

9. The system of claim 1, wherein the aerial vehicle computer is further programmed to proceed to the target location from a location other than the deploy location.

10. A method, comprising:
   proceeding to a target location upon receiving a message based on a ground vehicle being at an aerial vehicle deploy location;
   identifying a user from an image captured at the target location; and
   navigating the aerial vehicle to lead the user to a rendezvous with the vehicle, including by adjusting one or both of a speed and direction of the aerial vehicle according to detecting a speed and direction of the user following the aerial vehicle.

11. The method of claim 10, further comprising providing, from a ground vehicle computer, the message that the ground vehicle is at the deploy location.

12. The method of claim 11, wherein the ground vehicle computer is further programmed to navigate the ground vehicle to the target location.

13. The method of claim 10, further comprising determining the deploy location according to one or both of a specified time and specified distance to a pickup location.

14. The method of claim 10, further comprising identifying the user from an image captured at the target location by comparing the image captured at the target location with a stored image of a specified user.

15. The method of claim 10, further comprising sending a message to a user device at the target location.

16. The method of claim 10, further comprising providing, from a geographically remote computer, the message that the ground vehicle is at the deploy location.

17. The method of claim 10, wherein the message that the ground vehicle is at the deploy location is sent only after the ground vehicle is stopped at a pickup location selected based on the target location.

18. The method of claim 10, further comprising proceeding to the target location from a location other than the deploy location.

19. A system, comprising an aerial vehicle computer programmed to:
   proceed to a target location upon receiving a message based on a ground vehicle being at an aerial vehicle deploy location, wherein the message that the ground vehicle is at the deploy location is sent only after the ground vehicle is stopped at a pickup location selected based on the target location;
   identify a user from an image captured at the target location; and
   navigate the aerial vehicle to lead the user to a rendezvous with the vehicle.

20. A system, comprising:
   an aerial vehicle computer programmed to:
      proceed to a target location upon receiving a message based on a ground vehicle being at an aerial vehicle deploy location;
      identify a user from an image captured at the target location; and
      navigate the aerial vehicle to lead the user to a rendezvous with the vehicle; and
   a ground vehicle computer, programmed to:
      provide the message that the ground vehicle is at the deploy location, and
      navigate the ground vehicle to the target location.

\* \* \* \* \*